United States Patent [19]

Simpson et al.

[11] Patent Number: 4,645,368

[45] Date of Patent: Feb. 24, 1987

[54] QUICK DISCONNECT MECHANISM FOR SELECTIVELY SECURING A SHAFT TO A POWER TAKE-OFF END YOKE

[75] Inventors: John D. Simpson, Thamesford; Christopher C. Butler, Belle River, both of Canada

[73] Assignee: Dana Corporation, Toledo, Ohio

[21] Appl. No.: 822,026

[22] Filed: Jan. 24, 1986

[51] Int. Cl.$^4$ ............................. B25G 3/00; F16D 1/00
[52] U.S. Cl. ............................................ 403/9; 403/324; 403/327
[58] Field of Search .................... 403/9, 324, 327, 325, 403/322

[56] References Cited

U.S. PATENT DOCUMENTS

| | | | |
|---|---|---|---|
| 755,964 | 3/1904 | Swanson | 403/324 X |
| 1,681,699 | 8/1928 | Coates | 403/9 |
| 2,278,698 | 4/1942 | Green. | |
| 2,815,229 | 12/1957 | Cook. | |
| 2,885,231 | 5/1959 | Smith. | |
| 2,926,034 | 2/1960 | Weaver. | |
| 3,041,093 | 6/1962 | Bonfiglio | 403/9 |
| 3,070,390 | 12/1962 | Schroter et al. . | |
| 3,240,519 | 3/1966 | Weasler. | |

*Primary Examiner*—Andrew V. Kundrat
*Attorney, Agent, or Firm*—Willian Brinks Olds Hofer Gilson & Lione

[57] ABSTRACT

An improved quick disconnect mechanism between a rotatable end yoke hub of a power take-off and a journal shaft is disclosed. The hub has a central longitudinal passageway formed therethrough which is co-axial with the axis of rotation. An aperture is formed completely through the hub in a direction which is generally perpendicular to the longitudinal axis of the hub. The aperture extends at least partially through the passageway formed in the hub. One end of the aperture is formed with a reduced diameter portion, while an end plug is inserted through the other end of the aperture so as to close it. The end plug includes a body portion sized to fit within the aperture and a head portion sized larger than the aperture. Prior to installing the end plug, a locking pin is slidably disposed in the aperture.

9 Claims, 4 Drawing Figures

QUICK DISCONNECT MECHANISM FOR SELECTIVELY SECURING A SHAFT TO A POWER TAKE-OFF END YOKE

BACKGROUND OF THE INVENTION

The present invention relates in general to couplings for rotatable mechanical members and in particular to a quick disconnect mechanism for selectively connecting a journal shaft to an end yoke of a power take-off for rotation therewith.

Tractors and other heavy machinery have long been utilized to tow agricultural implements, while simultaneously providing motive power thereto. Typically, a power take-off connected to the tractor engine is provided at the rear of the tractor for supplying rotational motive power to a journal shaft of the agricultural implement. The power take-off is usually provided with a universal joint coupling to accommodate movement of the journal shaft. The output of the universal joint is an end yoke hub having a longitudinal passageway formed therethrough. The passageway is formed co-axially with respect to the axis of rotation of the hub. The journal shaft is adapted to be inserted longitudinally within the hub passageway. The interior of the hub and the exterior of the journal shaft are splined or squared in complementary fashion such that they rotate as a unit when the journal shaft is inserted within the hub. A locking device of some sort is usually required to prevent the journal shaft from being longitudinally withdrawn from the hub during use.

It is well known to provide a releasable coupling between such a hub and journal shaft assembly which permits selective disconnection thereof in a rapid and safe manner without the use of tools. Such a coupling usually includes an aperture formed through the hub in a direction which is generally perpendicular to the longitudinal axis of the hub. The aperture is located such that it extends at least partially through the hub passageway into the space normally occupied by the journal shaft. A locking pin is slidably disposed in the aperture. The journal shaft is provided with a groove in the exterior surface thereof to receive the pin therein. When the pin is inserted through the aperture formed through the hub and through the groove formed through the journal shaft, it prevents the removal of the journal shaft from the hub. The pin includes a recessed portion which, when aligned with the groove, permits the journal shaft to be removed from the hub without completely withdrawing the pin from the aperture. A spring is often provided to urge the pin to a position wherein the recess therein is not aligned with the journal shaft groove, thus normally preventing the removal of the journal shaft from the hub. Such designs often provide that a portion of the slidable locking pin extend outwardly from the hub inclined (relative to the radii of the hub and journal shaft) in a direction toward the direction of rotation of the hub and journal shaft during use.

SUMMARY OF THE INVENTION

The present invention relates to an improved quick disconnect mechanism between a rotatable end yoke hub of a power take-off and a journal shaft. The hub has a central longitudinal passageway formed therethrough which is co-axial with the axis of rotation. An aperture is formed completely through the hub in a direction which is generally perpendicular to the longitudinal axis of the hub. The aperture extends at least partially through the passageway formed in the hub. One end of the aperture is formed with a reduced diameter portion, while an end plug is inserted through the other end of the aperture so as to close it. The end plug includes a body portion sized to fit within the aperture and a head portion sized larger than the aperture. The body portion includes an enlarged diameter portion formed thereon which is slightly larger than the inner diameter of the aperture so as to be frictionally engaged thereby. The enlarged diameter portion may be formed as a circumferential projection, or alternatively as a thread. The head portion of the end plug is formed integrally with the body portion to permit rotation thereof during and after insertion. The enlarged diameter portion cuts a shallow groove in the hub during such rotation to securely retain the end plug therein. Prior to installing the end plug, a locking pin is slidably disposed in the aperture. The journal shaft is provided with a groove in the exterior surface thereof to receive the locking pin therein. When the locking pin is inserted through the hub aperture and the journal shaft groove, it prevents the removal of the journal shaft from the hub. The locking pin includes a recessed portion which, when aligned with the groove, permits the journal shaft to be removed from the hub. A spring is provided to urge the locking pin to a position wherein the recess therein is not aligned with the journal shaft groove, thus normally preventing the removal of the journal shaft from the hub. The portion of the slidable locking pin which extends outwardly from the hub is inclined (relative to the radii of the hub and journal shaft) in a direction away from the direction of rotation of the hub.

It is an object of the present invention to provide an improved coupling between an end yoke hub of a power take-off connected to an agricultural tractor engine and a journal shaft connected to an agricultural implement towed by the tractor.

It is another object of the present invention to provide such a coupling which permits rapid connection and disconnection thereof without the use of tools in a manner which is both simple and safe.

It is a further object of the present invention to provide such a coupling which is simple, inexpensive, and reliable in construction and operation.

Other objects and advantages of the present invention will become apparent to those skilled in the art from the following detailed description of the preferred embodiments, when read in light of the accompanying drawings.

DETAILED DESCRIPTION OF THE PREFERRED EMBODIMENTS

Figure 1:
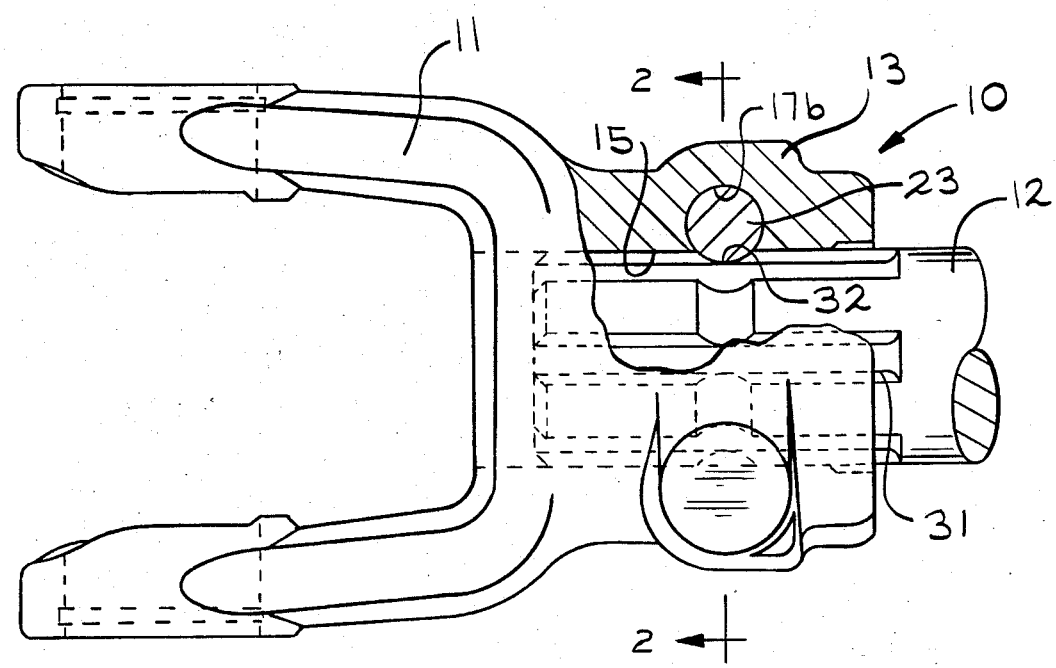
FIG 1 is a side elevational view, partially broken away, of an improved quick disconnect mechanism in accordance with the present invention.
Figure 2:
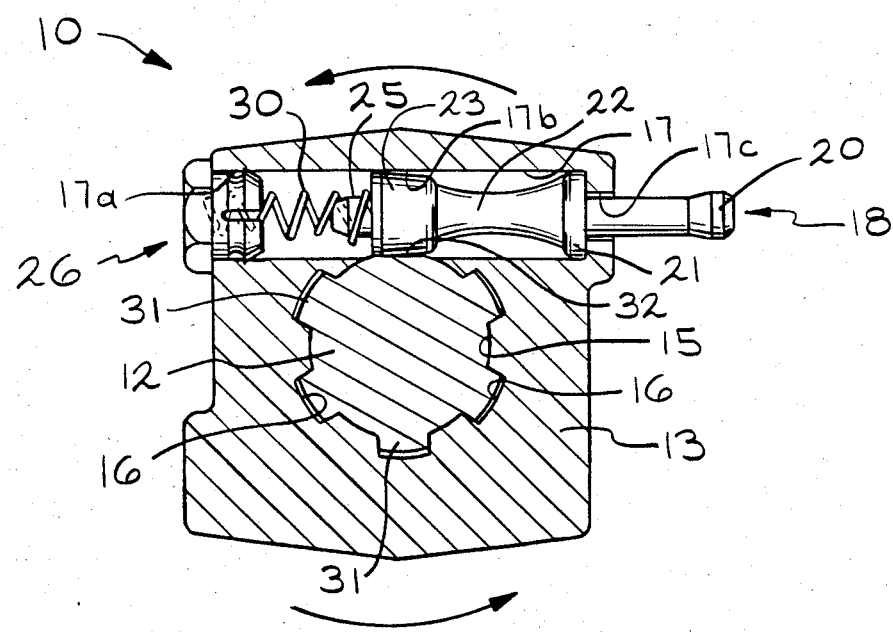
FIG. 2 is a sectional elevational view taken along line 2—2 of FIG. 1.

Referring now to the drawings, there is illustrated in FIGS. 1 and 2 an improved quick disconnect mechanism, indicated generally at 10, in accordance with the present invention. The mechanism 10 provides a releasable connection between an end yoke 11 of a power take-off (not shown) and a journal shaft 12. The power take-off can be connected to an engine (not shown) of an agricultural tractor or other machine so to provide a source of rotational motive power to the end yoke 11. The journal shaft 12 is adapted to operate an agricultural implement (not shown) in a known manner. The quick disconnect mechanism 10 of the present invention provides a releasable connection between the end yoke 11 and the journal shaft 12 such that rotation of the end yoke 11 causes corresponding rotation of the journal shaft 12 and, consequently, operation of the agricultural implement.

The end yoke 11 is provided with a hub 13 which extends longitudinally therefrom. The hub 13 has a generally cylindrical passageway 15 formed longitudinally therethrough. The passageway 15 is disposed co-axially with respect to the axis of rotation of the end yoke 11. A plurality of grooves 16 are formed in the inner surface of the passageway 15, for a purpose which will explained in detail below. The grooves 16 extend longitudinally throughout the passageway 15. A cylindrical aperture 17 is also formed through the hub 13. The aperture 17 extends in a direction which is generally perpendicular to the longitudinal axis of the hub 13. As best illustrated in FIG. 2, the aperture 17 extends from a first end 17a, which has a predetermined inner diameter, through a central region 17b, which has the same inner diameter as the first end 17a and extends partially into the passageway 15, to a second end 17c, which has a smaller inner diameter than the first end 17a and the central region 17b.

A locking pin, indicated generally at 18, is inserted within the aperture 17. The locking pin 18 includes an elongated head portion 20, a collar portion 21, a concave neck portion 22, and a body portion 23. A small projection 25 may be formed integrally with the body portion 23 extending longitudinally therefrom. The function of the projection 25 will be described in detail below. The head portion 20 of the locking pin 18 has an outer diameter which is slightly less than the inner diameter of the second end 17c of the aperture 17 so as to permit the head portion 20 to extend and slide freely therethrough. Similarly, the collar portion 21 and the body portion 23 of the locking pin 18 have outer diameters which are slightly less than the inner diameters of the first end 17a and the central region 17b of the aperture 17 so as to permit them to extend and slide freely therethrough. Thus, it will be appreciated that the locking pin 18 can be inserted within the aperture 17 through the first end 17a thereof, with the head portion 20 extending through the smaller second end 17c and out of the hub 13. The locking pin 18 is freely slidable throughout the aperture 17, except that the collar portion 21 of the locking pin 18 limits the movement of the locking pin 18 in one direction (toward the right when viewing FIG. 2) when it abuts the smaller diameter second end 17c of the aperture 17.

An end plug, indicated generally at 26, is provided to close the larger diameter first end 17a of the aperture 17 after the locking pin 18 has been inserted therein. The end plug 26 include a body portion 27, which is adapted to fit within the first end 17a of the aperture 17 and be retained therein, and a head portion 28, which is larger than the diameter of the aperture 17 and therefore maintained outside of the hub 13. The specific structure of the end plug 26 will be described in greater detail below. A spring 30 or other biasing means is also provided within the aperture 17 before the end plug 26 is inserted therein. The spring 30 extends longitudinally between the end plug 26 and the body portion 23 of the locking pin 18. The spring 30 is sized to extend about the projection 25 formed on the locking pin 18 to prevent the spring 30 from becoming oriented in a direction other than the illustrated longitudinal placement. The spring 30 urges the locking pin 18 into a first position, wherein the collar 21 abuts the smaller diameter second end 17c and the body portion 23 thereof is moved into the central region 17b of the aperture 17. Since the diameter of the body portion 23 is only slightly smaller than the diameter of the central region 17b, a portion of the body portion 23 extends into the passageway 15, as illustrated in FIG. 2, when the locking pin 18 is in its first position. When a force having a sufficient magnitude to overcome the urging of the spring 30 is applied longitudinally inwardly against the head portion 20 of the locking pin 18, however, the locking pin 18 will be moved to a second position, wherein the concave neck portion 22 of the locking pin 18 is moved into the central region 17b of the aperture 17. Since the concave neck portion 22 has a diameter which is much less than the diameter of the central region 17b, no portion of the locking pin 18 extends into the passageway 15 when the locking pin 18 is in its second position.

The journal shaft 13 is provided with a plurality of splines 31 formal in the exterior surface thereof. The splines 31 are formed in complementary fashion with respect to the grooves 16 formed in the passageway 15 of the hub 13. The splines 31 are adapted to cooperate with the grooves 16 in a well known manner prevent rotation of the journal shaft 12 relative to the hub 13, while permitting relative longitudinal movement therebetween. It will be appreciated that any means for preventing rotational movement of the journal shaft 12 relative to the hub 13, while permitting relative longitudinal movement, can be utilized. For example, the journal shaft 12 and the passageway 15 can be shaped square or rectangular in cross section, as opposed to the illustrated circular cross section with the splines 31. A groove 32 is formed in the exterior surface of the journal shaft 12. The journal shaft groove 32 extends in a direction which is generally perpendicular to the longitudinal axis of the journal shaft 12 and, consequently, is parallel to the longitudinal axis of the aperture 17 formed in the passageway 15 of the hub 13. The journal shaft groove 32 is formed inwardly of the end of the journal shaft 12 such that the splines 31 continue on both sides thereof. The journal shaft groove 32 is adapted to be aligned with the aperture 17 so as to retain the journal shaft 12 within the hub 13 at a desired longitudinal position relative thereto.

Since the splines 31 on the journal shaft 12 continue on both sides of the groove 32, the following steps must be performed in order to insert the journal shaft 12 within the hub 13. First, the locking pin 18 must be moved from its normal first position to its second position, in the manner described above, in order to position the reduced diameter neck portion 22 within the central region 17b of the aperture 17. Once this is done, the splines 31 are aligned with the passageway grooves 16, and the journal shaft 12 is inserted longitudinally through the passageway 15. The splines 31 on the journal shaft pass through the passageway aperture 17 because the reduced diameter neck portion 22 of the locking pin 18 does not extend into the passageway 15. When the journal shaft groove 32 is aligned with the aperture 17, the force applied to the locking pin 18 is removed, allowing it to move back to its first position under the urging of the spring 30. As a result, the body portion 23 of the locking pin 18 moves into the passageway 15, thereby abutting the splines 31 formed on the journal shaft 12 and preventing longitudinal movement of the journal shaft 12 relative to the hub 13.

As illustrated in FIG. 2, the head portion 20 of the locking pin 18 extends outwardly from the hub 13 on one side thereof. It is desirable to have the head portion 20 extend outwardly from the hub 13 so that the locking pin 18 can be moved from its first position to its second position easily without the use of tools. The hub 13 is connected to the power take-off such that it rotates in the direction of the arrows illustrated in FIG. 2. The head portion 20 is inclined, relative to the radii of the hub 13 and the journal shaft 12, in a direction away from the direction of rotation. Thus, an obtuse angle is formed the head portion 20 and the hub 13 facing toward the direction of rotation. In the past, quick disconnect mechanisms have reversed the position of the locking pin 18 within the aperture 17, such that the outwardly-extending head portion thereof was inclined toward the direction of rotation of the hub.

Figure 3:
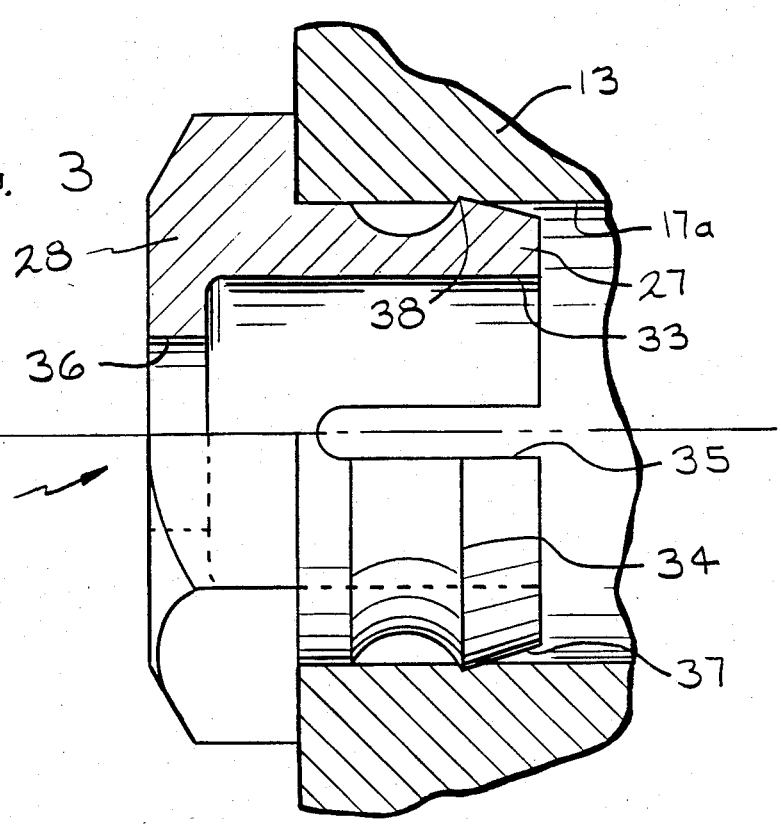
FIG. 3 is an enlarged side elevational view in half section of the aperture and end plug illustrated in FIGS. 1 and 2 with the spring removed.

Referring now to FIG. 3, the structure of the end plug 26 is illustrated in detail. As previously mentioned, the end plug 26 includes a body portion 27, which is adapted to fit within the first end 17a of the aperture 17 and be retained therein, and a head portion 28, which is larger than the diameter of the aperture 17 and therefore maintained outside of the hub 13. The body portion 27 of the end plug is shaped generally in conformance with the shape of the aperture 17. As shown in the illustrated embodiment, the body portion 27 is generally hollow and cylindrical. An interior cavity 33 is thus formed within the body portion 27. The outer diameter of the body portion 27 is generally slightly less than the inner diameter of the first end 17a of the aperture 17. However, an enlarged diameter portion 34 is provided on the body portion 27 having an outer diameter which is slightly larger than the inner diameter of the first end 17a of the aperture 17. In the embodiment illustrated in FIG. 3, the enlarged diameter portion 34 is generally circular in cross section. The innermost end of the body portion 27 is provided with a tapered surface 37, for a purpose which will be described below. The tapered surface 37 may extend from the enlarged diameter portion 34 to a tip having an outer diameter which is smaller than the inner diameter of the first end 17a. A pair of slots 35 are formed on the opposed sides of the body portion 27. If desired, additional slots (not shown) may also be formed in the body portion 27. Typically, such slots 35 are formed equidistantly about the periphery of the body portion 27. The slots 35 permit the opposed sides of the body portion 27 to flex inwardly toward each other during insertion of the end plug 26, as will be described in detail below. The head portion 28 of the end plug 26 can be formed in the shape of a hexagonal nut or other convenient shape which permits easy gripping thereof for rotation of the end plug 26. An aperture 36 is formed through the head portion 28 which communicates with the interior cavity 33.

To insert the end plug 26, the tapered surface 37 thereof is initially positioned against the first end 17a of the aperture 17 outside of the hub 13. A force is then applied against the head portion 28 directed inwardly along the longitudinal axis of the aperture 17. Typically, a sharp blow from a hammer or other object will provide a sufficient force to drive the body portion 27 inwardly into the first end 17a. As the body portion 27 is so inserted, the opposed sides thereof will be compressed slightly inwardly toward each other, by virtue of the slots 35, to accommodate the entry of the enlarged diameter portion 34 within the first end 17a. The end plug 26 is driven in until the head portion 28 engages the outer surface of the hub 13. A wrench (not shown) or other tool is then utilized to grip the head portion 28 and rotate the end plug 26 within the first end 17a. The end plug 26 is formed of a material which is harder than the material utilized to form the hub 13. As a result, rotation of the end plug 26 causes the enlarged diameter portion 34 to cut a small groove 38 in the first end 17a of the aperture. Depending upon the materials utilized, two or three revolutions of the end plug 26 are usually sufficient to form the groove 38. The cooperation of the enlarged diameter portion 34 with the groove 38 provides for secure retainment of the end plug 26 within the first end 17a of the aperture 17.

The following steps can be followed in order to remove the locking pin 18 from the hub 13 after the end plug 26 has been installed. A sharp blow can be delivered by a hammer or other heavy object against the outermost end of the head portion 20, thereby applying a large force axially against the locking pin 18. As a result, the locking pin 18 will slide axially through the aperture 17, against the urging of the spring 30, until the body portion 23 of the locking pin 18 abuts the body portion 27 of the end plug 26. If a force of sufficient magnitude is applied to the locking pin 18, the end plug 26 will be moved out of the first end 17a of the aperture 17. During such removal, the opposed sides of the body portion 27 will be compressed slightly inwardly toward each other as they are removed from the groove 38. In order to re-assemble the mechanism 10, the locking pin 18 and end plug 26 can be re-inserted as described above. The above-described end plug structure 26 and method of inserting such end plug 26 within the first end 17a of the aperture 17 is advantageous because it provides a relatively simple and efficient means for converting a prior art disconnect assembly to a quick disconnect mechanism 10 in accordance with the present invention. The present invention provides a mechanism which is quickly and easily adaptable to upgrade prior art assemblies.

Figure 4:
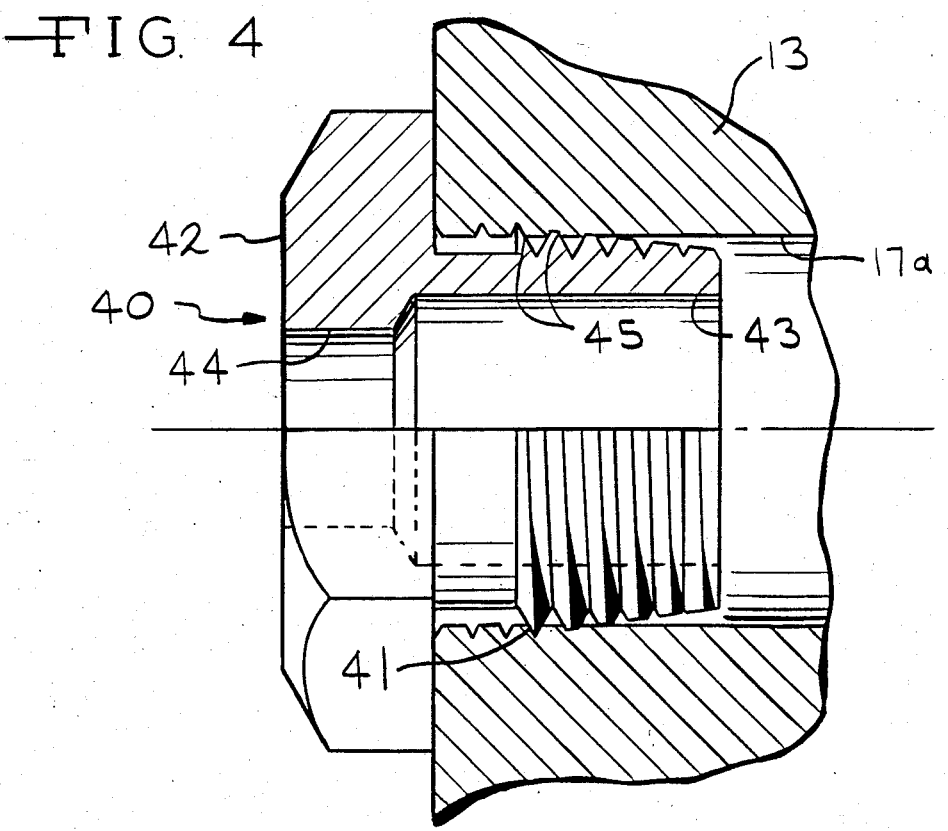
FIG. 4 is an enlarged side elevational view in half section, similar to FIG. 3, of an alternate embodiment of the end plug.

FIG. 4 illustrates an alternate embodiment of the present invention. As shown therein, a modified end plug, indicated generally at 40, is provided with a threaded body portion 41 and a head portion 42. The body portion 41 is formed with an interior cavity 43, while the head portion 42 is formed with an aperture 44 extending therethrough to the cavity 43. The threaded body portion 41 extends from an innermost end, having an outer diameter which is smaller than the inner diameter of the first end 17a, toward the head portion 42. The body portion 41 enlarges to an outer diameter which is slightly larger than the inner diameter of the first end 17a as it approaches the head portion 42. Thus, to install the modified end plug 40, the innermost end of the body portion 41 is initially inserted within the first end 17a of the aperture 17. The wrench or other tool is then utilized to engage the head portion 42 and rotate the end plug 40. The thread of the body portion 41 engages the surface of the first end 17a of the aperture 17, thereby drawing the end plug 40 therein. Rotation of the end plug 40 is stopped when the head portion 42 thereof abuts the outer surface of the hub 13. As a result of such rotation, a helical groove 45 is formed in the hub 13. The cooperation of the threaded body portion 41 with the groove 45 maintains the end plug 40 securely within the first plug 17a of the aperture 17.

In accordance with the provisions of the patent statutes, the principle and mode of operation of the present invention have been explained and illustrated in its preferred embodiments. However, it must be appreciated that the present invention can be practiced otherwise than as specifically explained and illustrated without departing from its spirit or scope.

What is claimed is:

1. A quick disconnect mechanism for selectively securing a shaft to a power take-off end yoke adapted to rotate in one direction about an axis comprising:

a hub secured to the end yoke having a passageway formed therein co-axial with the axis of rotation of the end yoke and adapted to receive a portion of the shaft therein, said hub having an aperture formed therethrough extending in a direction generally perpendicular to the axis of rotation and extending at least partially through said passageway;

means formed on said hub passageway and the shaft for preventing relative rotational movement therebetween while permitting relative longitudinal movement therebetween;

a groove formed in the exterior surface of the shaft extending in a direction generally perpendicular to the axis of rotation and adapted to be aligned with said hub aperture when the shaft is inserted in said hub passageway;

locking pin means disposed in said hub aperture for selectively extending into said hub passageway and said shaft groove to prevent the removal of the shaft from said hub passageway, said locking pin means including a head portion extending outwardly from said hub through one end of said aperture, said head portion being inclined away from the direction of rotation; and end plug means for closing the other end of said aperture, said end plug means including a body portion having an enlarged diameter portion formed thereon having an outside diameter which is slightly larger than the inner diameter of said hub aperture, whereby said end plug means is retained within said aperture.

2. The invention defined in claim 1 wherein said enlarged diameter portion is generally circular in cross section and is received in a corresponding groove formed in said hub aperture.

3. The invention defined in claim 2 wherein said body portion tapers from said enlarged diameter portion to a tip having an outer diameter which is smaller than the inner diameter of said hub aperture.

4. The invention defined in claim 3 wherein said body portion is provided with an interior cavity and a pair of slots formed on the opposed sides thereof.

5. The invention defined in claim 4 wherein said end plug means further includes an enlarged head portion connected to said body portion, said head portion including an aperture formed therethrough into said interior cavity.

6. The invention defined in claim 1 wherein said enlarged diameter portion is formed generally in the shape of a helical thread and is received in a corresponding groove formed in said hub aperture.

7. The invention defined in claim 6 wherein said body portion tapers from said enlarged diameter portion to a tip having an outer diameter which is smaller than the inner diameter of said hub aperture.

8. The invention defined in claim 7 wherein said body portion is provided with an interior cavity and a pair of slots formed on the opposed sides thereof.

9. The invention defined in claim 8 wherein said end plug means further includes an enlarged head portion connected to said body portion, said head portion including an aperture formed therethrough into said interior cavity.

* * * * *